US 9,433,889 B2

(12) United States Patent
Komiya et al.

(10) Patent No.: US 9,433,889 B2
(45) Date of Patent: Sep. 6, 2016

(54) PALLADIUM ALLOY MEMBRANE UNIT, STORAGE STRUCTURE THEREOF, AND METHOD OF PURIFYING HYDROGEN BY USING THE SAME

(71) Applicant: Japan Pionics Co., Ltd., Hiratsuka-shi, Kanagawa (JP)

(72) Inventors: Yoshinao Komiya, Hiratsuka (JP); Satoshi Arakawa, Hiratsuka (JP); Toshio Akiyama, Hiratsuka (JP); Yasuo Sato, Hiratsuka (JP); Noboru Takemasa, Hiratsuka (JP)

(73) Assignee: JAPAN PIONICS CO., LTD., Kanagawa (JP)

( * ) Notice: Subject to any disclaimer, the term of this patent is extended or adjusted under 35 U.S.C. 154(b) by 0 days.

(21) Appl. No.: 14/581,284

(22) Filed: Dec. 23, 2014

(65) Prior Publication Data

US 2015/0196871 A1   Jul. 16, 2015

(30) Foreign Application Priority Data

Jan. 16, 2014  (JP) ................................. 2014-005545
Feb. 21, 2014  (JP) ................................. 2014-031550

(51) Int. Cl.
*B01D 53/22* (2006.01)
*B01D 71/02* (2006.01)
(Continued)

(52) U.S. Cl.
CPC .......... *B01D 53/228* (2013.01); *B01D 63/022* (2013.01); *B01D 63/024* (2013.01);
(Continued)

(58) Field of Classification Search
CPC ............... B01D 53/22; B01D 53/228; B01D 2053/223; B01D 2053/224; B01D 63/02; B01D 63/022; B01D 63/024; B01D 63/06; B01D 71/022; B01D 2313/21; B01D 2256/16; C01B 3/503; C01B 2203/0233; C01B 2203/0405; C01B 2203/043; C01B 2203/046
See application file for complete search history.

(56) References Cited

U.S. PATENT DOCUMENTS 2,961,062 A * 11/1960 Hickey .................. B01D 53/22
                                                                96/8
3,251,173 A *  5/1966 Ehlers ..................... C01B 3/501
                                                                96/8
(Continued)

FOREIGN PATENT DOCUMENTS

JP         S62-128903 A     6/1987
JP         6-171904    *    6/1994   ............. B01D 53/22
(Continued)

OTHER PUBLICATIONS

English language machine translation for JP 6-171904. Retrieved from http://translationportal.epo.org on Feb. 1, 2016.*
(Continued)

*Primary Examiner* — Jason M Greene
(74) *Attorney, Agent, or Firm* — Fitch, Even, Tabin & Flannery, LLP

(57) ABSTRACT

The present invention is to provide a means for easily replacing palladium alloy capillaries in a hydrogen purification device formed by using hydrogen separation membrane formed from the palladium alloy capillaries. The hydrogen purification device can be easily disassembled into a palladium alloy membrane unit and a storage structure thereof. A palladium alloy membrane unit is provided with a plurality of palladium alloy capillaries, a disk-shaped tube sheet supporting the palladium alloy capillaries, a pure hydrogen discharge pipe having a cylinder being in close contact with a periphery of the tube sheet at one end, a joint connecting with a pure hydrogen outlet of the storage structure at the other end, and preferably a joint being in close contact with an opening of a container of the storage structure at a position between the cylinder and the outlet joint. The storage structure is provided with a container storing the palladium alloy membrane unit, a heater, a raw material hydrogen inlet, an impurity-containing gas outlet, and a pure hydrogen outlet, a member provided on the pure hydrogen outlet, the member connecting with a joint provided at one end of the palladium alloy membrane unit, and preferably a member provided on the opening of the container, the member being in close contact with a joint provided on the cylinder of the palladium alloy membrane unit.

5 Claims, 8 Drawing Sheets

(51) Int. Cl.
*C01B 3/50* (2006.01)
*B01D 63/02* (2006.01)

(52) U.S. Cl.
CPC ............ *B01D71/022* (2013.01); *C01B 3/505* (2013.01); *B01D 2053/223* (2013.01); *B01D 2256/16* (2013.01); *B01D 2313/21* (2013.01); *C01B 2203/0233* (2013.01); *C01B 2203/043* (2013.01); *C01B 2203/0405* (2013.01); *C01B 2203/046* (2013.01)

(56) References Cited

U.S. PATENT DOCUMENTS

| | | | | |
|---|---|---|---|---|
| 5,205,841 | A * | 4/1993 | Vaiman | B01D 53/22 95/56 |
| 5,614,001 | A * | 3/1997 | Kosaka | B01D 53/22 96/10 |
| 5,931,987 | A * | 8/1999 | Buxbaum | B01D 53/22 95/56 |
| 9,169,118 | B1* | 10/2015 | Bossard | B01D 63/06 |
| 2010/0005960 | A1 | 1/2010 | Noda | |
| 2012/0012004 | A1* | 1/2012 | Way | B01D 53/228 96/11 |

FOREIGN PATENT DOCUMENTS

| | | |
|---|---|---|
| JP | H06171904 A | 6/1994 |
| JP | 2000-34108 A | 2/2000 |
| JP | 2000128903 | 5/2000 |
| JP | 2001145302 A | 5/2001 |
| JP | 2001145303 A | 5/2001 |
| WO | 2006/105539 | 10/2006 |

OTHER PUBLICATIONS

EP Search Report of Appln. No. 14198803.0 dated Jun. 1, 2015 in English.

* cited by examiner

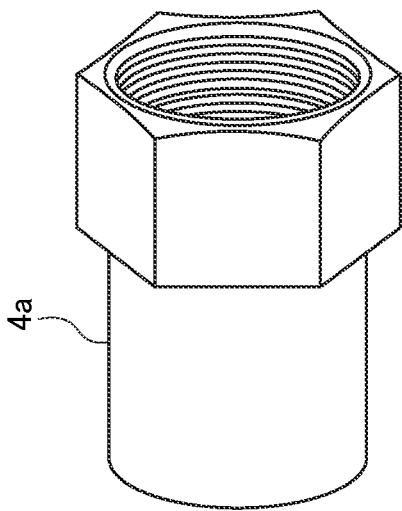
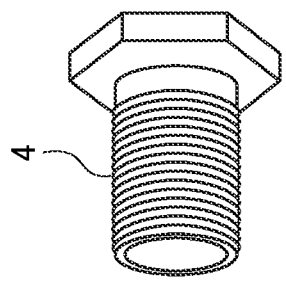
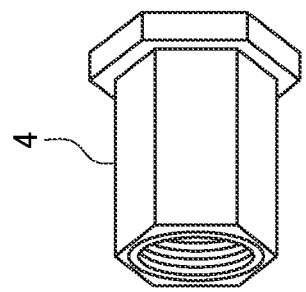
FIG. 3C
FIG. 3B
FIG. 3A

PALLADIUM ALLOY MEMBRANE UNIT, STORAGE STRUCTURE THEREOF, AND METHOD OF PURIFYING HYDROGEN BY USING THE SAME

TECHNICAL FIELD

The present invention relates to hydrogen purification by using the hydrogen gas selective permeability of palladium alloy membrane. Specifically, the present invention relates to a palladium alloy membrane unit provided with palladium alloy capillaries or the like, a storage structure storing the palladium alloy membrane unit and making up a hydrogen purification device together with the palladium alloy membrane unit, and a method of purifying hydrogen by using the same.

BACKGROUND ART

Conventionally, a large amount of high-purity hydrogen gas is used as atmosphere gas in the semiconductor manufacturing process. Such hydrogen gas is required to contain an extremely low concentration of impurities (below ppb level) because the integration degree of semiconductor device increases.

A method of industrially manufacturing a large amount of high-purity hydrogen gas is known, in which reformed gas obtained from methanol, dimethyl ether, natural gas, and liquefied petroleum gas, etc. by steam-reforming reaction is separated into hydrogen and gas other than hydrogen by cryogenic adsorption, pressure swing adsorption, etc. to obtain hydrogen.

The cryogenic adsorption is to obtain hydrogen by circulating hydrogen-containing gas to an adsorption column filled with cryogenic adsorbent by using liquid nitrogen as refrigerant to remove impurities other than hydrogen. The pressure swing adsorption is to obtain hydrogen by repeating the processes such as pressurizing, adsorbing and desorbing impurities, and recovering adsorbent while circulating hydrogen-containing gas to a plurality of adsorption columns sequentially. The reformed gas contains carbon monoxide, carbon dioxide, methane, nitrogen, water, etc. besides hydrogen. In cryogenic adsorption and pressure swing adsorption, impurities hardly removed until the concentration of impurities is extremely low (below ppb level).

In contrast to these methods, a method of producing a relatively small amount of ultrahigh-purity hydrogen gas is known, in which raw material hydrogen containing impurities is supplied to hydrogen separation membrane formed from palladium alloy membrane to collect hydrogen from the raw material hydrogen by using the hydrogen gas permselectivity. A device for such hydrogen purification is provided with an inlet for raw material hydrogen containing impurities, an outlet for pure hydrogen, a gas passage between the inlet and the outlet, and a palladium alloy membrane in the gas passage. Such a device has a structure, for example, in which a plurality of palladium alloy capillaries (hydrogen separation membrane) each having one end being closed and the other end being opened are supported at the open end by a tube sheet and stored in a cell, and the palladium alloy capillaries and the tube sheet divide the cell into two spaces which are a primary side space (an inlet space for raw material hydrogen containing impurities) and a secondary side space (an outlet space for pure hydrogen), as shown in Patent Documents 1 to 3.

CITATION LIST

Patent Literature

Patent Document 1: JP 62-128903A
Patent Document 2: JP 01-145302A
Patent Document 3: JP 01-145303A

DISCLOSURE OF THE INVENTION

The method of purifying hydrogen by using hydrogen separation membrane made of palladium alloy has the advantage of being able to obtain high-purity hydrogen gas compared with cryogenic adsorption and pressure swing adsorption as mentioned above and also to downsize and simplify the device but has the disadvantage of collecting a small amount of pure hydrogen per unit time. The permeation amount of hydrogen per unit area Q of the hydrogen separation membrane is calculated by the following expression: $Q = At^{-1}(P_1^{1/2} - P_2^{1/2})$. In the expression, A represents a numerical value determined by the type, the operating condition, etc. of the separation membrane, t represents the thickness of the hydrogen separation membrane, $P_1$ represents the hydrogen partial pressure of the primary side space, and $P_2$ represents the hydrogen partial pressure of the secondary side space.

In the hydrogen purification device as described above, the membrane thickness of the palladium alloy capillaries (hydrogen separation membrane) is usually set to 100 μm or less in order to ensure an appropriate amount of pure hydrogen. This decreases the mechanical strength of the palladium alloy capillaries to cause the destruction of the palladium alloy capillaries before long after the hydrogen purification device is used for a long term. Therefore, palladium alloy capillaries likely to be destroyed are required to be replaced with new ones after used for a predetermined period, i.e. before destroyed.

For example, if the difference between the hydrogen partial pressure $P_1$ of the primary side space and the hydrogen partial pressure $P_2$ of the secondary side space is increased, the amount of purified hydrogen to be collected can increase. However, if do so, the mechanical strength of the palladium alloy capillaries decreases faster, which requires to frequently replace palladium alloy capillaries. Furthermore, the palladium alloy capillaries are required to be replaced immediately when gas leaks from around the palladium alloy capillaries after the decrease in the mechanical strength of the palladium alloy capillaries is overlooked.

When replaced with new ones, destroyed palladium alloy capillaries are hardly detached from the tube sheet to attach new ones. Moreover, when the palladium alloy capillaries and the tube sheet supporting the same are replaced with their respective new ones at once, it is time-consuming to attach to and detach the tube sheet from a hydrogen purification device and ensure the airtightness.

Therefore, an objective of the present invention is to provide a means for easily replacing palladium alloy capillaries in hydrogen purification using hydrogen separation membrane formed from the palladium alloy capillaries.

As the result of their extensive study to solve the problems, the present inventors have found that the hydrogen purification device as described above is divided into a composition part (palladium alloy membrane unit) provided with a plurality of palladium alloy capillaries, a disk-shaped tube sheet supporting the palladium alloy capillaries, and a pure hydrogen discharge pipe; and a composition part (storage structure) provided with a container storing these components, a heater heating the inside of the container, and an inlet and an outlet for each gas necessary for hydrogen purification, and these component parts are easily assembled and disassembled by using a joint without losing the airtightness from the hydrogen purification device when the component parts are integrated, so that palladium alloy capillaries can be easily replaced. Then, the present inventors have accomplished the present invention according to (1) to (11).

(1) A palladium alloy membrane unit stored in a container and integrated with a storage structure to make up a hydrogen purification device, the storage structure being provided with the container, a raw material hydrogen inlet, and a pure hydrogen outlet, including:

a plurality of palladium alloy capillaries; a tube sheet; and a pure hydrogen discharge pipe, in which the plurality of palladium alloy capillaries each have a close end and an open end, the close end is formed by closing one end of each of the plurality of palladium alloy capillaries, the open end is formed at the other end of each of the plurality of palladium alloy capillaries, the tube sheet has a disk-shaped periphery and a plurality of supports, the plurality of supports each support each of the plurality of palladium alloy capillaries at their respective open ends, and the discharge pipe has an discharge pipe body, a cylinder formed at one end of the discharge pipe body, the cylinder being in close contact with the periphery, and an outlet joint formed at the other end of the discharge pipe body and connected with the pure hydrogen outlet.

(2) A palladium alloy membrane unit stored in a container and integrated with a storage structure to make up a hydrogen purification device, the storage structure being provided with the container, a raw material hydrogen inlet, and a pure hydrogen outlet, including:

a plurality of palladium alloy capillaries; a tube sheet; and a pure hydrogen discharge pipe, in which the plurality of palladium alloy capillaries each have a close end and an open end, the close end is formed by closing one end of each of the plurality of palladium alloy capillaries, the open end is formed at the other end of each of the plurality of palladium alloy capillaries, the tube sheet has a disk-shaped periphery and a plurality of supports, the plurality of supports each support each of the plurality of palladium alloy capillaries at their respective open ends, and the discharge pipe has an discharge pipe body, a cylinder formed at one end of the discharge pipe body, the cylinder being in close contact with the periphery, an outlet joint formed at the other end of the discharge pipe body and connected with the pure hydrogen outlet, and a container joint is in close contact with the opening of the container at a position between the cylinder and the outlet joint.

(3) The palladium alloy membrane unit according to (1), in which the tube sheet, the discharge pipe, and the outlet joint are coaxially set.

(4) The palladium alloy membrane unit according to (2), in which the tube sheet, the discharge pipe, the outlet joint, and the container joint are coaxially set.

(5) The palladium alloy membrane unit according to (1) or (2), in which the tube sheet is made from nickel, the discharge pipe is made from stainless steel, and the tube sheet is weld to the discharge pipe with alloy of nickel, chrome, and iron.

(6) The palladium alloy membrane unit according to (1), in which the outlet joint has a detaching part having a capability of attaching to and detaching from a connecting member provided in the storage structure for connecting with the outlet joint.

(7) The palladium alloy membrane unit according to (2), in which the outlet joint has a detaching part having a capability of attaching to and detaching from a connecting member provided in the storage structure for connecting with the outlet joint, and the container joint has a detaching part having a capability of attaching to and detaching from a contact member provided in the storage structure for being in close contact with the container joint.

(8) A storage structure storing the palladium alloy membrane unit according to (1) and making up a hydrogen purification device together with the palladium alloy membrane unit, comprising:

a container having an opening formed at the end and storing the plurality of palladium alloy capillaries inserted from the opening;

a heater heating the inside of the container from the outside;

a raw material hydrogen inlet supplying raw material hydrogen containing impurities to the container;

an impurity-containing gas outlet removing gas containing impurities not permeating the palladium alloy membrane from the container; and a pure hydrogen outlet having a connecting member having a capability of connecting with the outlet joint.

(9) A storage structure storing the palladium alloy membrane unit according to (2) and making up a hydrogen purification device together with the palladium alloy membrane unit, comprising:

a container having an opening formed at the end and a contact member in the opening, the contact member having a capability of being in close contact with the container joint, the container storing the plurality of palladium alloy capillaries inserted from the opening;

a heater heating the inside of the container from the outside;

a raw material hydrogen inlet supplying raw material hydrogen containing impurities to the container;

an impurity-containing gas outlet removing gas containing impurities not permeating the palladium alloy membrane from the container; and a pure hydrogen outlet having a connecting member having a capability of connecting with the outlet joint.

(10) A method of purifying hydrogen, in which the palladium alloy membrane unit according to (1) is stored in the storage structure according to (8), including:

after the plurality of palladium alloy capillaries are used for a predetermined period, after the mechanical strength of the plurality of palladium alloy capillaries decreases, or after gas leaks from around the plurality of palladium alloy capillaries, replacing the palladium alloy membrane unit including the plurality of palladium alloy capillaries with a new one; and purifying hydrogen.

(11) A method of purifying hydrogen, in which the palladium alloy membrane unit according to (2) is stored in the storage structure according to (9), including:

after the plurality of palladium alloy capillaries are used for a predetermined period,
after the mechanical strength of the plurality of palladium alloy capillaries decreases, or
after gas leaks from around the plurality of palladium alloy capillaries,
replacing the palladium alloy membrane unit including the plurality of palladium alloy capillaries with a new one; and purifying hydrogen.

The present invention can easily assemble and disassemble a hydrogen purification device provided with a palladium alloy membrane unit including a plurality of palladium alloy capillaries, a disk-shaped tube sheet supporting these palladium alloy capillaries, and a pure hydrogen discharge pipe; and a storage structure including a container, a raw material hydrogen inlet, and a pure hydrogen outlet by using one or two joints (outlet joint and container joint). Due to such a structure, the present invention can easily replace the palladium alloy membrane unit itself with a new one without losing the airtightness from the inside of the hydrogen purification device when the palladium alloy capillaries are required to be replaced, for example, when the mechanical strength of the palladium alloy capillaries decreases.

BRIEF DESCRIPTION OF DRAWINGS

FIGS. 3A, 3B and 3C each are a perspective view illustrating one example of a pipe joint used in the present invention.

BEST MODE FOR CARRYING OUT THE INVENTION

The present invention is applied to a hydrogen purification device or a method of purifying hydrogen, in which the inside of the cell is divided into a primary side space and a secondary side space by palladium alloy capillaries each having one end being closed and a tube sheet supporting the open end of each of the palladium alloy capillaries, in which hydrogen containing impurities is introduced from the primary side space to allow hydrogen to permeate the palladium alloy capillaries so as to collect hydrogen from the secondary side space.

The raw material hydrogen applied in the present invention includes reformed gas obtained from methanol, dimethyl ether, natural gas, liquefied petroleum gas, etc. by steam-reforming reaction and relatively high-purity hydrogen gas obtained by previously purifying this reformed gas by cryogenic adsorption, pressure swing adsorption, etc. Hydrogen obtained by these methods is typically stored in storage such as gas cylinder or storage tank.

The ultrahigh-purity hydrogen obtained in the present invention is used as, for example, atmosphere gas (carrier gas) in the semiconductor manufacturing process.

The palladium alloy membrane unit, the storage structure thereof, and a method of purifying hydrogen by using the same of the present invention will be explained with reference to FIGS. 1 to 8. However, the present invention is not limited to these embodiments.

Figure 1:
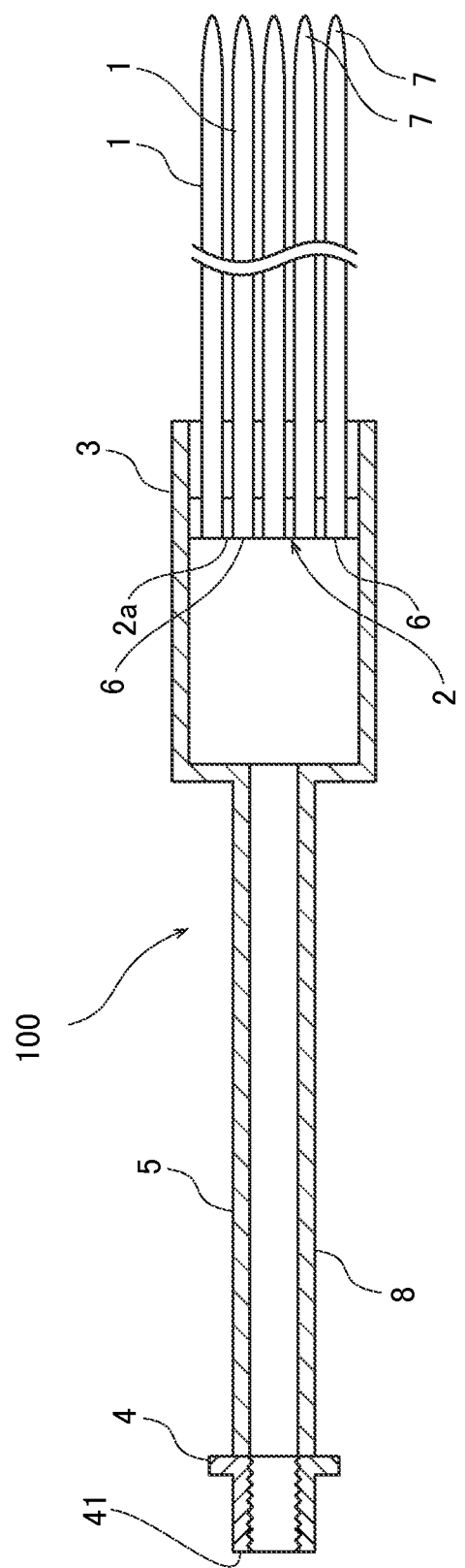
FIG. 1 is a block diagram illustrating one example of the palladium alloy membrane unit of the first embodiment of the present invention.

FIG. 1 is a block diagram illustrating one example of the palladium alloy membrane unit of the first embodiment of the present invention.

Figure 2:
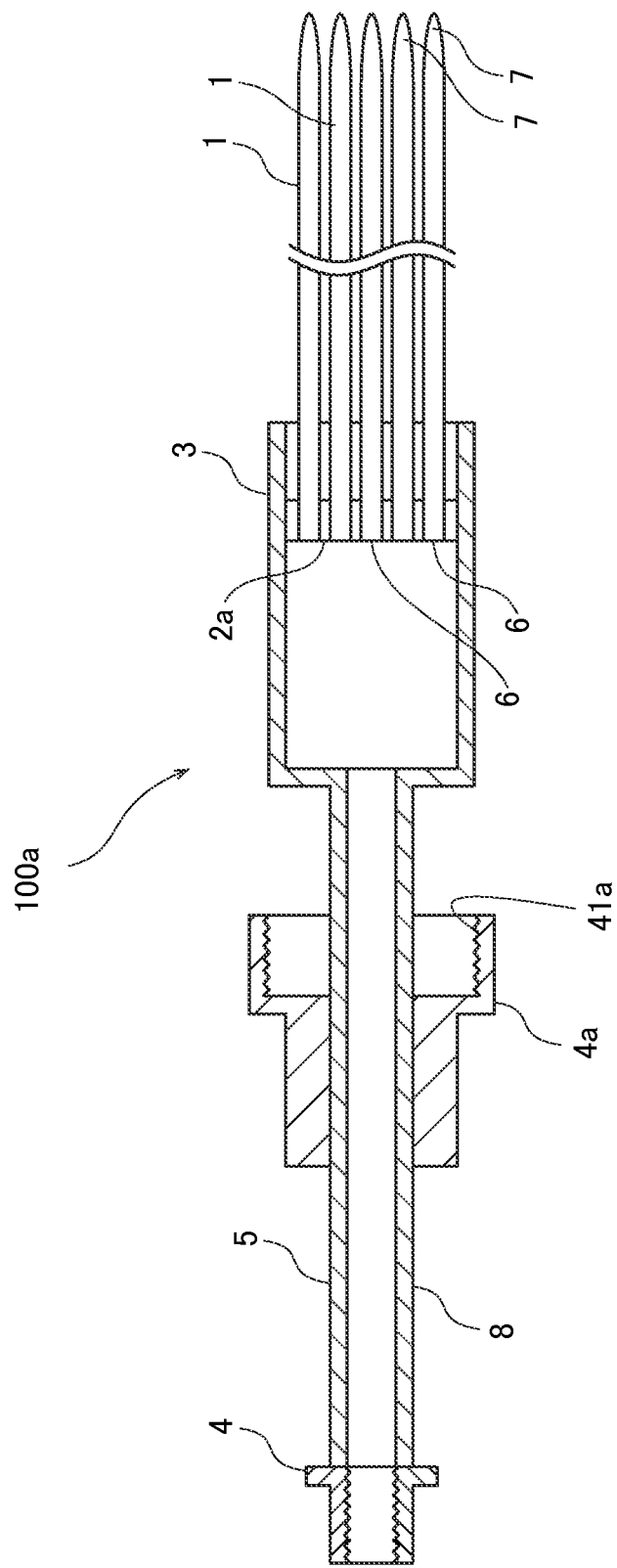
FIG. 2 is a block diagram illustrating one example of the palladium alloy membrane unit of the second embodiment of the present invention.

FIG. 2 is a block diagram illustrating one example of the palladium alloy membrane unit of the second embodiment of the present invention.

FIGS. 3A, 3B and 3C each are a perspective view illustrating one example of a pipe joint used in the present invention.

Figure 4:
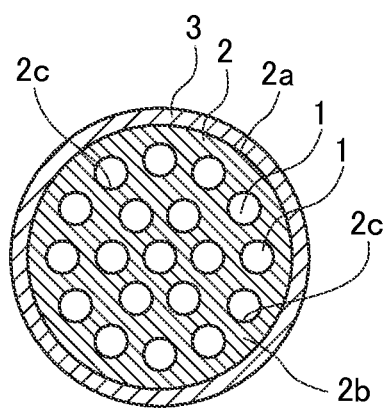
FIG. 4 is a block diagram illustrating one example of the cross section of the palladium alloy membrane unit at the tube sheet of FIGS. 1 and 2.

FIG. 4 is a block diagram illustrating one example of the cross section of the palladium alloy membrane unit at the tube sheet of FIGS. 1 and 2.

Figure 5:
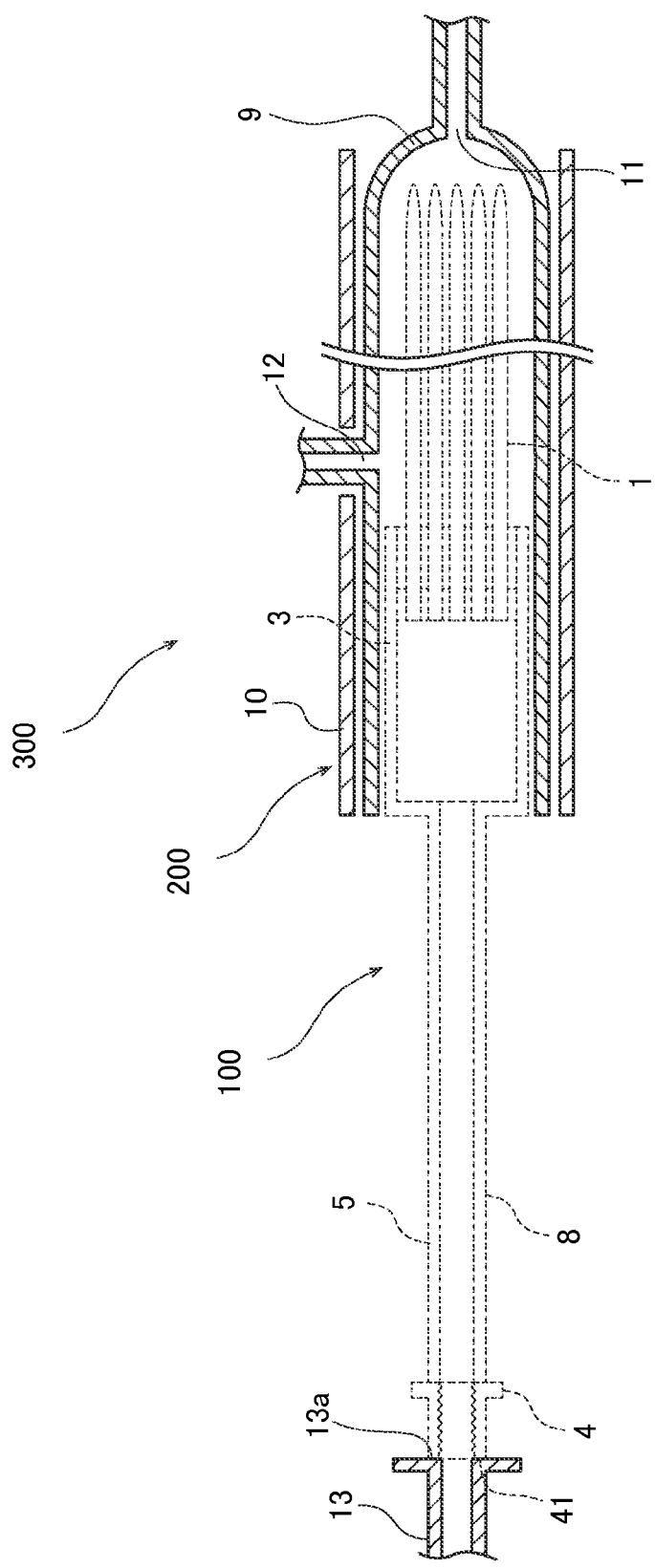
FIG. 5 is a block diagram illustrating one example of the storage structure of the first embodiment of the present invention.

FIG. 5 is a block diagram illustrating one example of the storage structure of the first embodiment of the present invention.

Figure 6:
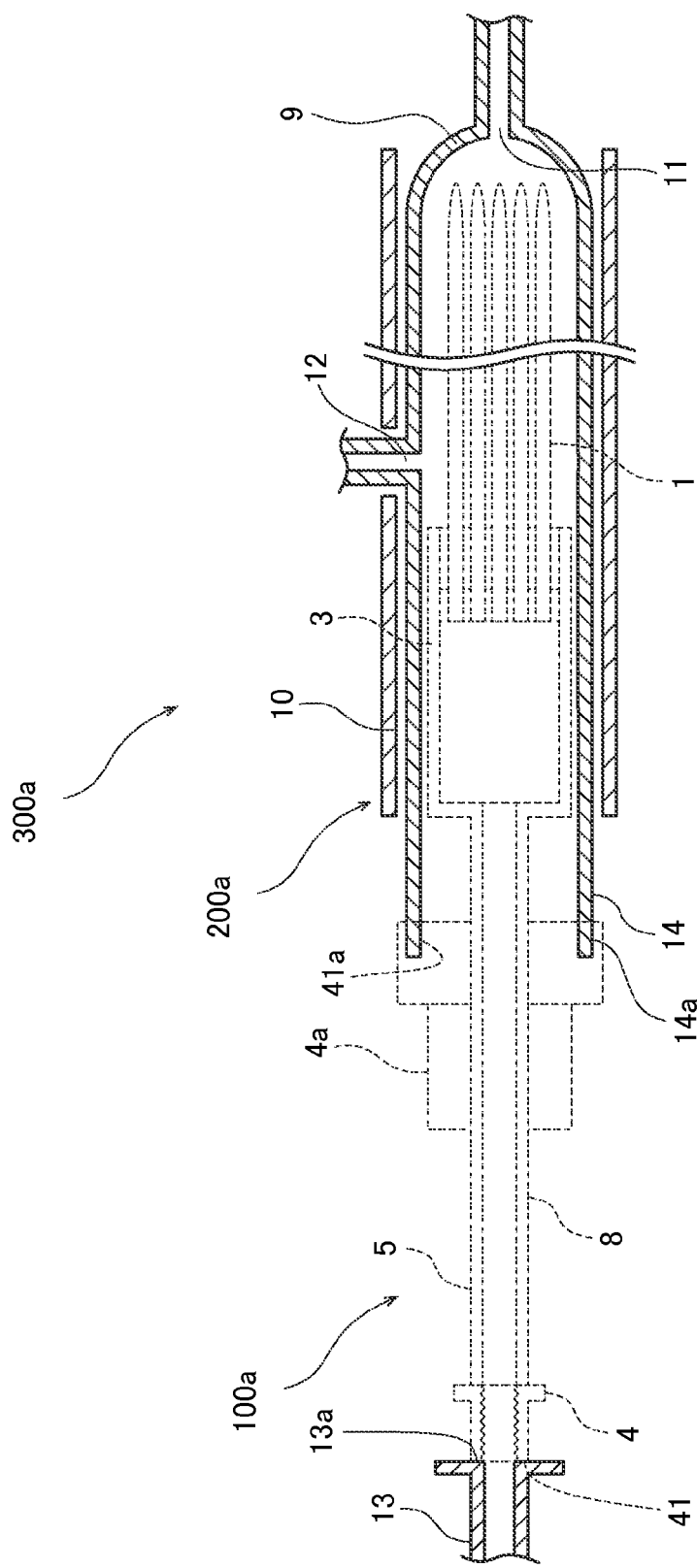
FIG. 6 is a block diagram illustrating one example of the storage structure of the second embodiment of the present invention.

FIG. 6 is a block diagram illustrating one example of the storage structure of the second embodiment of the present invention.

Figure 7:
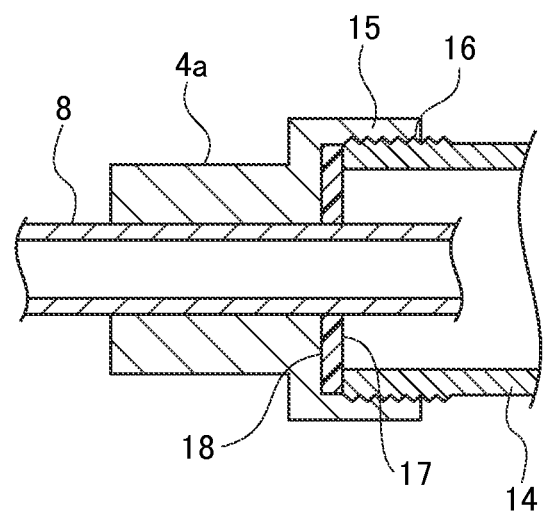
FIG. 7 is a cross-sectional view illustrating one example of the connecting structure in which the container joint of the palladium alloy membrane unit connects with the opening of the container of the storage structure.

FIG. 7 is a cross-sectional view illustrating one example of the connecting structure in which the container joint of the palladium alloy membrane unit connects with the opening of the container of the storage structure.

Figure 8A:
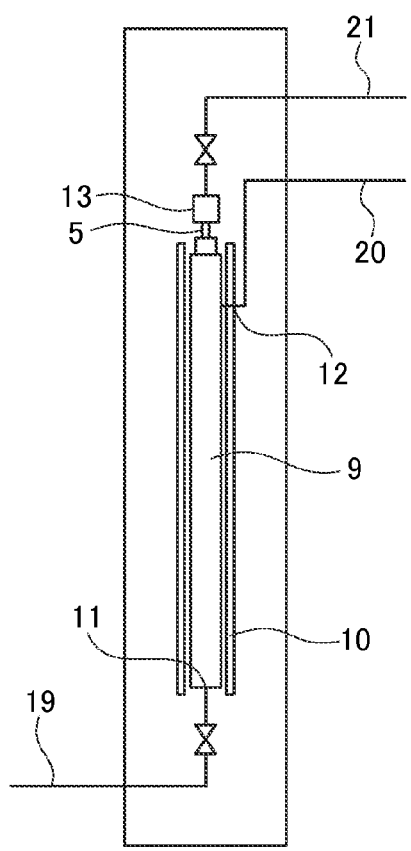
FIGS. 8A and 8B each are a block diagram illustrating one example of the hydrogen purification device in which the palladium alloy membrane unit and the storage structure thereof of the present invention are integrated.
Figure 8B:
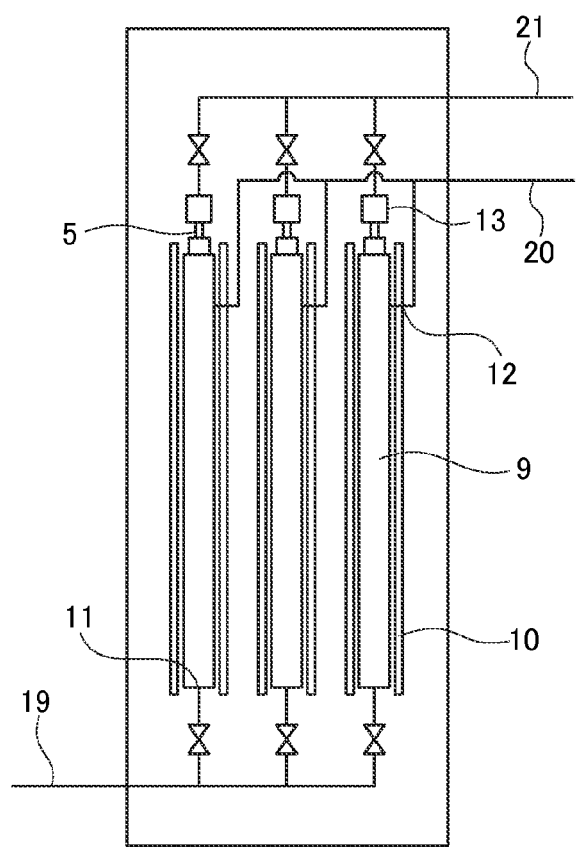

FIGS. 8A and 8B each are a block diagram illustrating one example of the hydrogen purification device in which the palladium alloy membrane unit and the storage structure of the present invention are integrated.

As shown in FIGS. 5 and 6, the palladium alloy membrane unit 100, 100a of the present invention is stored in a container 9 and integrated with a storage structure 200, 200a to make up a hydrogen purification device 300, 300a, the storage structure 200, 200a being provided with the container 9, a raw material hydrogen inlet 11, and a pure hydrogen outlet 13. A palladium alloy membrane unit 100 of the first embodiment and a palladium alloy membrane unit 100a of the second embodiment of the present invention will be explained in detail below.

As shown in FIG. 1, a palladium alloy membrane unit 100 of the first embodiment of the present invention is provided with a plurality of palladium alloy capillaries 1 each having one end being closed and an open end 6 being at the other end; a disk-shaped tube sheet 2 supporting the palladium alloy capillaries 1 at their respective open ends 6; and a pure hydrogen discharge pipe 5 having a cylinder 3 being in close contact with a periphery 2b of the tube sheet 2 at one end, and an outlet joint 4 connecting with a pure hydrogen outlet 13 of the storage structure 200 at the other end. The disk-shaped tube sheet 2, the pure hydrogen discharge pipe 5, and the outlet joint 4 are typically coaxially set.

Specifically, the palladium alloy membrane unit 100 is provided with a plurality of palladium alloy capillaries 1, a tube sheet 2, and a pure hydrogen discharge pipe 5. The plurality of palladium alloy capillaries 1 each have a close end 7 and an open end 6. The close end 7 is formed by closing one end of each of the plurality of palladium alloy capillaries 1. The open end 6 is formed at the other end of each of the plurality of palladium alloy capillaries 1. The tube sheet 2 has a tube sheet body 2a, a disk-shaped periphery 2b, and a plurality of supports 2c (see FIG. 4). The plurality of supports 2c each support each of the plurality of palladium alloy capillaries 1 at their respective open ends 6. Each of the supports 2c is a through hole formed in the tube sheet body 2a, for example.

The discharge pipe 5 has an discharge pipe body 8, a cylinder 3 formed at one end of the discharge pipe body 8, the cylinder 3 being in close contact with the periphery 2b, and an outlet joint 4 formed at the other end of an discharge pipe body 8 and connected with a pure hydrogen outlet 13 (see FIG. 5). The ratio of the length of the discharge pipe 5 to the palladium alloy membrane unit 100 is set to fit into the size of the storage structure 200 to which the palladium alloy membrane unit 100 is attached and the size of the hydrogen purification device 300.

As shown in FIG. 2, a palladium alloy membrane unit 100a of the second embodiment of the present invention is provided with a plurality of palladium alloy capillaries 1 each having one end being closed and an open end 6 being at the other end; a disk-shaped tube sheet 2 supporting the palladium alloy capillaries 1 at their respective open ends 6; a pure hydrogen discharge pipe 5 having a cylinder 3 being in close contact with a periphery 2b of the tube sheet 2 at one end, an outlet joint 4 connecting with a pure hydrogen outlet 13 of the storage structure 200a at the other end, and a container joint 4a being in close contact with an opening 14 of the container 9 of the storage structure 200a at a position between the cylinder 3 and the outlet joint 4. The disk-shaped tube sheet 2, the pure hydrogen discharge pipe 5, the outlet joint 4, and the container joint 4a are typically coaxially set. For the outlet joint 4 and the container joint 4a, for example, a metal packing made of nickel is used. The container joint 4a is not limited in particular as long as withstanding a temperature of up to about 300° C. in hydrogen purification.

Specifically, the palladium alloy membrane unit 100a is provided with a plurality of palladium alloy capillaries 1, a tube sheet 2, and a pure hydrogen discharge pipe 5. The plurality of palladium alloy capillaries 1 each have a close end 7 and an open end 6. The close end 7 is formed by closing one end of each of the plurality of palladium alloy capillaries 1. The open end 6 is formed at the other end of each of the plurality of palladium alloy capillaries 1. The tube sheet 2 has a tube sheet body 2a, a disk-shaped periphery 2b, and a plurality of supports 2c (see FIG. 4). The plurality of supports 2c each support each of the plurality of palladium alloy capillaries 1 at their respective open ends 6. Each of the supports 2c is a through hole formed in the tube sheet body 2a, for example. The discharge pipe 5 has an discharge pipe body 8, a cylinder 3 formed at one end of the discharge pipe body 8, the cylinder 3 being in close contact with the periphery 2b, an outlet joint 4 formed at the other end of the discharge pipe body 8 and connected with a pure hydrogen outlet 13 (see FIG. 6), and a container joint 4a being in close contact with an opening 14 (see FIG. 6) of the container 9 at a position between the cylinder 3 and the outlet joint 4.

As shown in FIG. 1, the palladium alloy capillaries 1 used in the palladium alloy membrane unit of the present invention each have an open end 6 at one end in the tube sheet 2 side and a close end 7 at the other end opposite to the tube sheet 2 side. The palladium alloy capillaries 1 typically have a length of from 20 to 200 cm, an outer diameter of from 1.0 to 5.0 mm, and a thickness of from 30 to 100 µm. The number of the palladium alloy capillaries 1 used in one palladium alloy membrane unit 100 is from 3 to 1000. The arrangement of the palladium alloy capillaries 1 is not limited in particular. The distance between any two adjacent palladium alloy capillaries is typically set to from 1.0 to 2.5 mm.

Examples of the component of the above-described palladium alloy capillaries 1 include alloy of palladium and copper as major ingredients, alloy of palladium and silver as major ingredients, and alloy of palladium, silver, and gold as major ingredients. When these alloys are used, alloy of from 50 to 70 wt % of palladium and from 30 to 50 wt % of copper, alloy of from 60 to 90 wt % of palladium and from 10 to 40 wt % of silver, and alloy of from 60 to 80 wt % of palladium, from 10 to 37 wt % of silver, and from 3 to 10 wt % of gold are preferable. The palladium alloy may contain other metals. In this case, the palladium alloy contains the above-described metals (above-described palladium, gold, silver or copper) in a content of typically 95 wt % or more, preferably 99 wt % or more.

The tube sheet 2 used in the present invention is typically a disk with a thickness of from 3 to 30 mm. The diameter of the tube sheet 2 varies according to the diameter, the number, etc. of the palladium alloy capillaries 1 but is typically from 10 to 200 mm, preferably from 15 to 50 mm. The diameter of the tube sheet 2 is preferably ⅒ or less, more preferably ⅟₁₅ or less of the length of the palladium alloy capillaries 1. The reason is because the palladium alloy membrane unit 100, 100a is elongated to decrease the diameter of the cylinder 3 and the container joint 4a of the discharge pipe 5 so that gas is more certainly prevented from leaking from around the cylinder 3 and the container joint 4a when hydrogen is purified with the palladium alloy membrane unit 100, 100a being stored in the container 9 (see FIGS. 5 and 6).

As shown in FIG. 3, the tube sheet 2 is provided with through holes to insert the palladium alloy capillaries 1 at the positions to which the respective palladium alloy capillaries 1 are attached. The palladium alloy capillaries 1 are supported by the tube sheet 2 through welding etc. The supports 2c are formed from these through holes by welding. In this case, a coiled spring may optionally be inserted in each of the palladium alloy capillaries 1 in order to ensure a flow path space for pure hydrogen having permeated the hydrogen separation membrane. The tube sheet 2 is preferably made of nickel.

The pure hydrogen discharge pipe 5 used in the present invention has a cylinder 3 being in close contact with the periphery 2b of the tube sheet 2 at the end in the tube sheet 2 side. The cylinder 3 only has to be formed into a cylinder shape at least on the side of the periphery 2b of the tube sheet 2 so as not to leak gas from the part being in close contact with the tube sheet 2. The part between the discharge pipe body 8 and the tube sheet 2 may have a shape of U as shown in FIG. 1 or shapes of circular truncated cone, semicircle, etc. or any shapes resemble thereto. The pure hydrogen discharge pipe 5 has an outlet joint 4, for example, one of a female joint and a male joint shown in FIGS. 3A and 3B, respectively, in which the outlet joint 4 connects with the pure hydrogen outlet 13 of the storage structure 200 at the end opposite to the tube sheet 2.

In a palladium alloy membrane unit of the second embodiment of the present invention, the pure hydrogen discharge pipe 5 has a container joint 4a, for example, a female joint shown in FIG. 3C or a male joint (not shown) at a position between the cylinder 3 and the outlet joint 4, in which the container joint 4a is in close contact with the opening 14 of the container 9 of the storage structure 200. The container joint 4a is typically fixedly attached to the discharge pipe body 8 of the pure hydrogen discharge pipe 5 at a preferable position in relationship to the length of the palladium alloy capillaries 1 and the length of the container 9 of the storage structure 200.

The outlet joint 4 and the container joint 4a are set detachably from respective connecting members (connecting member 13a and contact member 14a, respectively) provided in the below-described storage structure 200, 200a connecting and being in close contact, respectively, with these respective joints. The outlet joint 4 has a detaching part 41 having a capability of attaching to and detaching from a connecting member 13a provided in the storage structure 200 for connecting with the outlet joint 4. The container joint 4a has a detaching part 41a having a capability of attaching to and detaching from a contact member 14a provided in the storage structure 200a for being in close contact with the container joint 4a. For example, when the pure hydrogen outlet 13 of the storage structure 200 has a male joint, the outlet joint 4 is a female joint in which the male joint is screwed. On the other hand, when the pure hydrogen outlet 13 of the storage structure 200 has a female joint, the outlet joint 4 is a male joint screwed in the female joint. Likewise, when the opening 14 of the container 9 of the storage structure 200a has a male joint, the container joint 4a is a female joint in which the male joint is screwed. On the other hand, when the opening 14 of the container 9 of the storage structure 200a has a female joint, the container joint 4a is a male joint screwed in the female joint.

The outlet joint 4 is not limited in particular to any types, structures, sizes, etc. of the joint as long as having a function capable of supplying pure hydrogen having permeated the palladium alloy capillaries 1 to the pure hydrogen outlet 13 of the storage structure 200 without leaking pure hydrogen. The container joint 4a is not limited in particular to any types, structures, sizes, etc. of the joint as long as having a function capable of ensuring the airtightness of the opening 14 of the container 9 of the storage structure 200a. For example, a one-touch joint etc. without screw thread may be used for the outlet joint 4 and the container joint 4a. When the joints in the storage structure as the counterpart members independently have their respective above-described functions, the joints of the pure hydrogen discharge pipe 5 may be a pipe with a simple structure having a shape of cylinder etc. This case falls within the scope of the present invention. The pure hydrogen discharge pipe 5 is preferably made of stainless steel, as well as the cylinder 3, the outlet joint 4, and the container joint 4a. The tube sheet 2 and the cylinder 3 are welded with alloy of nickel, chrome, and iron.

As shown in FIGS. 5 and 6, the storage structure 200, 200a of the present invention stores the palladium alloy membrane unit 100, 100a as described above and makes up a hydrogen purification device 300, 300a together with the palladium alloy membrane unit 100, 100a. In the storage structure 200, 200a of the present invention, the palladium alloy capillaries 1, the tube sheet 2, and the cylinder 3 of the pure hydrogen discharge pipe 5 in the palladium alloy membrane unit 100, 100a as described above are at least stored in the container 9. A storage structure 200 of the first embodiment and a storage structure 200a of the second embodiment of the present invention will be explained in detail below.

As shown in FIG. 5 (solid line), a storage structure 200 of the first embodiment of the present invention is provided with a U-shaped container 9 storing a palladium alloy membrane unit 100 of the first embodiment; a heater 10 heating the inside of the container 9 from the outside; a raw material hydrogen inlet 11 supplying raw material hydrogen containing impurities to the container 9; an impurity-containing gas outlet 12 removing gas containing impurities not permeating the palladium alloy membrane from the container 9; and a pure hydrogen outlet 13 having a member (connecting member 13a) having a capability of connecting with the outlet joint 4 provided at one end of the pure hydrogen discharge pipe 5 of a palladium alloy membrane unit 100 of the first embodiment.

More specifically, a storage structure 200 of the first embodiment of the present invention stores a palladium alloy membrane unit 100 of the first embodiment and makes up a hydrogen purification device 300 together with the palladium alloy membrane unit 100. The storage structure 200 is provided with a container 9 having an opening 14 formed at the end and storing the plurality of palladium alloy capillaries 1 inserted from the opening 14; a heater 10 heating the inside of the container 9 from the outside; a raw material hydrogen inlet 11 supplying raw material hydrogen containing impurities to the container 9; an impurity-containing gas outlet 12 removing gas containing impurities not permeating the palladium alloy membrane from the container 9; and a pure hydrogen outlet 13 having a connecting member 13a having a capability of connecting with the outlet joint 4.

As shown in FIG. 6 (solid line), a storage structure 200a of the second embodiment of the present invention is provided with a U-shaped container 9 having a contact member having a capability of being in close contact with the container joint 4a of a palladium alloy membrane unit 100a of the second embodiment and storing the palladium alloy membrane unit 100a; a heater 10 heating the inside of the container 9 from the outside; a raw material hydrogen inlet 11 supplying raw material hydrogen containing impurities to the container 9; an impurity-containing gas outlet 12 removing gas containing impurities not permeating the palladium alloy membrane from the container 9; and a pure hydrogen outlet 13 having a member (connecting member 13a) having a capability of connecting with the outlet joint 4 provided at one end of the pure hydrogen discharge pipe 5 of a palladium alloy membrane unit 100a of the second embodiment.

More specifically, a storage structure 200a of the second embodiment of the present invention stores a palladium alloy membrane unit 100a of the second embodiment and makes up a hydrogen purification device 300a together with the palladium alloy membrane unit 100a. The storage structure 200a is provided with a container 9 having an opening 14 formed at the end and a contact member 14a having a capability of being in close contact with the container joint 4a, the container storing the plurality of palladium alloy capillaries 1 inserted from the opening 14; a heater 10 heating the inside of the container 9 from the outside; a raw material hydrogen inlet 11 supplying raw material hydrogen containing impurities to the container 9; an impurity-containing gas outlet 12 removing gas containing impurities not permeating the palladium alloy membrane from the container 9; and a pure hydrogen outlet 13 having a connecting member 13a having a capability of connecting with the outlet joint 4.

The container 9 used in the storage structure 200, 200a of the present invention has a shape of U viewed from the front but may have any shapes obtained by rotating the U-shape or any shapes resemble thereto. Moreover, the shape of the cross section of the sidewall is typically a circle but not limited thereto. The container 9 is typically from 1.05 to 1.3 times longer than the palladium alloy capillaries 1. The distance between the bottom of the container 9 (raw material hydrogen inlet 11) and the close end 7 of each of palladium alloy capillaries 1 is preferably set to be small to allow hydrogen to efficiently permeate the palladium alloy capillaries. The distance is typically set to from 1 to 10 cm. The container 9 is typically made of stainless steel.

The raw material hydrogen inlet 11 and the impurity-containing gas outlet 12 are located anywhere without any particular limitation as long as being closer to upstream than the tube sheet 2. However, the raw material hydrogen inlet 11 and the impurity-containing gas outlet 12 are preferably set away from each other. In FIGS. 5 and 6, the positions of the raw material hydrogen inlet 11 and the impurity-containing gas outlet 12 may be swapped.

At the tip of the pure hydrogen outlet 13, a member having a capability of connecting with the outlet joint 4 of the palladium alloy membrane unit, for example, any one of a female joint and a male joint shown in FIGS. 3A and 3B, respectively, is provided as shown in FIGS. 5 and 6. However, the member is not limited to these joints. For example, a one-touch joint etc. without screw thread may be used for the member as in the pure hydrogen discharge pipe 5 of the palladium alloy membrane unit.

Furthermore, in a storage structure 200a of the second embodiment of the present invention, a member (contact member 14a) having a capability of being in close contact with the container joint 4a of a palladium alloy membrane unit 100a of the second embodiment is provided at the tip 16 of the opening 14 of the container 9. For example, in the connecting structure of the container joint 4a shown in FIG. 7, female screw thread is provided on the inner circumference of the tip 15 of the container joint 4a, and male thread is provided on the outer circumference of the tip 16 of the opening 14. The opening 14 is screwed to the container joint 4a to allow the packing 17 to be in close contact with the wall 18 so that airtightness can be obtained in the connecting structure. In the present invention, the connecting structure is not limited to the above-described one as long as airtightness is ensured between the container joint 4a and the opening 14. For example, a one-touch joint etc. without screw thread may be used for the contact member 14a.

A method of purifying hydrogen of the first embodiment and a method of purifying hydrogen of the second embodiment of the present invention will be explained in detail below.

A method of purifying hydrogen of the first embodiment of the present invention, in which a palladium alloy membrane unit 100 of the first embodiment is stored in a storage structure 200 of the first embodiment, includes after the palladium alloy capillaries 1 are used for a predetermined period, after the mechanical strength of the palladium alloy capillaries 1 decreases, or after gas leaks from around palladium alloy capillaries 1, replacing the palladium alloy membrane unit 100 including the palladium alloy capillaries 1 with a new one; and purifying hydrogen.

A method of purifying hydrogen of the second embodiment of the present invention, in which a palladium alloy membrane unit 100a of the second embodiment is stored in a storage structure 200a of the second embodiment, includes after the palladium alloy capillaries 1 are used for a predetermined period, after the mechanical strength of the palladium alloy capillaries 1 decreases, or after gas leaks from around palladium alloy capillaries 1, replacing the palladium alloy membrane unit 100a including the palladium alloy capillaries 1 with a new one; and purifying hydrogen.

In the present invention, the predetermined period to use the palladium alloy capillaries 1 depends on the condition of the palladium alloy capillaries 1 (membrane thickness etc.), the condition of hydrogen purification (temperature, gas pressure, etc.), the use frequency, etc. but is typically from 6 months to 5 years. The mechanical strength of the palladium alloy capillaries 1 decreases, for example, when pinholes etc. are generated in the palladium alloy membrane forming the palladium alloy capillaries 1, when the palladium alloy membrane deteriorates, or when the palladium alloy membrane changes in quality.

When hydrogen is purified in the present invention, the palladium alloy membrane unit 100,100a is stored in the storage structure 200, 200a, and each pipe is connected to assemble the hydrogen purification device 300, 300a, as shown in FIGS. 5 and 6; and then the raw material hydrogen inlet 11 of the storage structure 200, 200a is connected with a raw material hydrogen supply pipe 19, the impurity-containing gas outlet 12 is connected with an impurity-containing gas collection pipe 20, and the pure hydrogen outlet 13 is connected with a pure hydrogen collection pipe 21, as shown in FIGS. 8A and 8B.

In the second embodiment, a space with a length of preferably from 0.2 to 10 mm, more preferably from 0.5 to 5 mm is located between the cylinder 3 of the pure hydrogen discharge pipe 5 of the palladium alloy membrane unit 100a and the sidewall of the container 9 of the storage structure 200a in order to easily store the palladium alloy membrane unit 100a in the storage structure 200a. Even if passing the space and flowing to the pipe body 8, raw material hydrogen can be prevented from leaking to the outside by the container joint 4a being in close contact with the opening 14 of the container 9 of the storage structure 200a.

In the first embodiment, the space as described above is preferably not located. If there is a space, a seal member such as a heat-resistant packing or a screw thread part etc. engaging with each other is provided so as to prevent raw material hydrogen from leaking.

Subsequently, raw material hydrogen containing impurities is supplied from the raw material hydrogen inlet 11 to the container 9 heated with the heater 10 to purify hydrogen. The temperature of the palladium alloy capillaries 1 in hydrogen purification is typically from 250 to 500° C., preferably from 300 to 450° C. The raw material gas is preferably introduced to the hydrogen purification device after previously heated to about the above-described temperature with a preheater etc. The raw material hydrogen is brought in close contact with the heated palladium alloy capillaries 1, and then only hydrogen permeates the palladium alloy capillaries 1 and is supplied to the pure hydrogen outlet 13 through the pipe body 8 of the pure hydrogen discharge pipe 5. Gas not permeating the palladium alloy capillaries 1 is collected from the impurity-containing gas outlet 12.

In the method of purifying hydrogen of the present invention, as the difference of the hydrogen partial pressure between the primary side (upstream side from the palladium alloy capillaries 1) of the container 9 and the secondary side (downstream side from the palladium alloy capillaries 1) of the cell increases, the permeation amount of hydrogen per unit time increases. Therefore, in the present invention, raw material hydrogen is typically supplied under a pressure larger than atmospheric pressure to decrease the pressure in the secondary side of the cell to a pressure equal to or less than atmospheric pressure. When palladium alloy capillaries 1 with a thin thickness are used under such atmosphere for a long term, the mechanical strength decreases to cause the destruction of the palladium alloy capillaries 1 before long. Therefore, the palladium alloy membrane unit including palladium alloy capillaries 1 is preferably replaced with a new one before the destruction of the palladium alloy capillaries 1. The palladium alloy membrane unit is replaced in the same way whenever the mechanical strength of the palladium alloy capillaries 1 decreases or whenever it is needed.

EXAMPLES

The present invention will be explained below with reference to the following examples but is not limited thereto.

Example 1

Preparation of palladium alloy membrane unit of first embodiment 35 palladium alloy capillaries 1 (outer diameter: 1.8 mm, thickness: 70 µm, length: 300 mm) formed of alloy of palladium, silver, and gold as major ingredients were welded to a disk-shaped nickel tube sheet 2 with a diameter of 25 mm and a thickness of 5 mm along a plurality of concentric circles. A pure hydrogen discharge pipe 5 (outer diameter and length of pipe body 8: 7 mm and 200 mm, respectively) having a cylinder 3 (internal diameter: 25 mm, length: 20 mm) at one end and a male joint (internal diameter and length of screw thread part: 30 mm and 70 mm, respectively) as shown in FIG. 3B at the other end was prepared. Subsequently, the cylinder 3 was welded to the tube sheet 2 with alloy of nickel, chrome, and iron to prepare a palladium alloy membrane unit shown in FIG. 1.
Preparation of Storage Structure of First Embodiment and Hydrogen Purification Device After a heater 10 was provided outside a U-shaped container 9 (internal diameter: 25 mm, length: 400 mm) having a raw material hydrogen inlet 11 and an impurity-containing gas outlet 12, a pure hydrogen outlet 13 was provided. Then, a female joint to engage with the male joint of the palladium alloy membrane unit was provided at the tip to prepare a storage structure.

Subsequently, the palladium alloy membrane unit was stored in the storage structure. After the male joint of the palladium alloy membrane unit was connected with the female joint of the storage structure, a raw material hydrogen supply pipe 19, an impurity-containing gas collection pipe 20, and a pure hydrogen collection pipe 21 were connected to the storage structure to prepare a hydrogen purification device as shown in FIG. 8A.
Hydrogen Purification Test The inside of the U-shaped container was heated to 600° C., and hydrogen was introduced and subject to heat processing for 10 hours. Subsequently, the temperature was decreased to 420° C. While the differential pressure between the space in the primary side (upstream from the palladium alloy capillaries 1) and the space in the secondary side (downstream from the palladium alloy capillaries 1) was controlled to be 1.0 MPa, raw material hydrogen containing impurities (nitrogen, oxygen, carbon dioxide, etc.) in a content of about 400 ppm in total was introduced from the raw material hydrogen inlet 11 to purify hydrogen. As a result, 820 L of pure hydrogen was obtained from the pure hydrogen outlet 13 after 1 hour processing.

At this time, the discharge amount of gas containing impurities based on the supplied amount of raw material gas was controlled to be about 2% in this example (impurities: 400 ppm).
Replacement of Palladium Alloy Membrane Unit In the above-described hydrogen purification test, the palladium alloy membrane unit was replaced as follows on the presumption that the mechanical strength of the palladium alloy capillaries 1 decreased.

After the hydrogen purification test ended, the valve of the pure hydrogen collection pipe 21 was closed. After nitrogen was introduced from the raw material hydrogen inlet 11 to make a nitrogen atmosphere in the U-shaped container, the male joint of the palladium alloy membrane unit and the female joint of the storage structure were disconnected. Subsequently, the pure hydrogen outlet 13 of the storage structure was moved, the palladium alloy membrane unit was removed from the storage structure, and then a new palladium alloy membrane unit was stored in the storage structure. Then, the pure hydrogen outlet 13 of the storage structure was returned to original position, and the male joint of the unit was connected with the female joint of the storage structure to complete the replacement of the unit.

Example 2

Preparation of palladium alloy membrane unit of second embodiment 35 palladium alloy capillaries 1 (outer diameter: 1.8 mm, thickness: 70 µm, length: 300 mm) formed of alloy of palladium, silver, and gold as major ingredients were welded to a disk-shaped nickel tube sheet 2 with a diameter of 25 mm and a thickness of 5 mm along a plurality of concentric circles. A pure hydrogen discharge pipe 5 (outer diameter and length of pipe body 8: 7 mm and 200 mm, respectively) having a cylinder 3 (internal diameter: 25 mm, length: 20 mm) at one end, a male joint as shown in FIG. 3B at the other end, and a female joint (internal diameter and length of screw thread part: 30 mm and 70 mm, respectively) as shown in FIG. 3C at the middle was prepared. Subsequently, the cylinder 3 was welded to the tube sheet 2 with alloy of nickel, chrome, and iron to prepare a palladium alloy membrane unit shown in FIG. 2.
Preparation of Storage Structure of Second Embodiment and Hydrogen Purification Device After a heater 10 was provided outside a U-shaped container 9 (internal diameter: 30 mm, length: 400 mm) having a raw material hydrogen inlet 11, an impurity-containing gas outlet 12, and a male joint screwed in the female joint of the palladium alloy membrane unit at the tip 16 of the opening, a pure hydrogen outlet 13 was provided. Then, a female joint as shown in FIG. 3A in which the male joint of the palladium alloy membrane unit is screwed was provided at the tip to prepare a storage structure.

Subsequently, the palladium alloy membrane unit was stored in the storage structure. After the male joint of the palladium alloy membrane unit was connected with the female joint of the storage structure, a raw material hydrogen supply pipe 19, an impurity-containing gas collection pipe 20, and a pure hydrogen collection pipe 21 were connected to the storage structure to prepare a hydrogen purification device as shown in FIG. 8A.
Hydrogen Purification Test The inside of the U-shaped container was heated to 600° C., and hydrogen was introduced and subject to heat processing for 10 hours. Subsequently, the temperature was decreased to 420° C. While the differential pressure between the space in the primary side (upstream from the palladium alloy capillaries 1) and the space in the secondary side (downstream from the palladium alloy capillaries 1) was controlled to be 1.0 MPa, raw material hydrogen containing impurities (nitrogen, oxygen, carbon dioxide, etc.) in a content of about 400 ppm in total was introduced from the raw material hydrogen inlet 11 to purify hydrogen. As a result, 830 L of pure hydrogen was obtained from the upstream side of the pure hydrogen outlet 13 after 1 hour processing.

At this time, the discharge amount of gas containing impurities based on the supplied amount of raw material gas was controlled to be about 2% in this example (impurities: 400 ppm).

Replacement of Palladium Alloy Membrane Unit

In the above-described hydrogen purification test, the palladium alloy membrane unit was replaced as follows on the presumption that the mechanical strength of the palladium alloy capillaries 1 decreased.

After the hydrogen purification test ended, the valve of the pure hydrogen collection pipe 21 was closed. After nitrogen was introduced from the raw material hydrogen inlet 11 to make a nitrogen atmosphere in the U-shaped container, the two joints were disconnected. Subsequently, the pure hydrogen outlet 13 of the storage structure was moved, the palladium alloy membrane unit was removed from the storage structure, and then a new palladium alloy membrane unit was stored in the storage structure. Then, the pure hydrogen outlet 13 of the storage structure was returned to original position, and the two joints were connected with each other to complete the replacement of the palladium alloy membrane unit.

As described above, a hydrogen purification device formed by using the palladium alloy membrane unit and the storage structure thereof of the present invention can easily be integrally assembled and disassembled by one or two joints. In the hydrogen purification device, the palladium alloy membrane unit including palladium alloy capillaries can be easily replaced with a new one when the palladium alloy capillaries are required to be replaced, for example, when the mechanical strength of the palladium alloy capillaries decreases because the integrally assembled hydrogen purification device does not lose its airtightness.

REFERENCE SIGNS LIST 1 palladium alloy capillary
2 tube sheet
3 cylinder
4 outlet joint
4a container joint
5 pure hydrogen discharge pipe
6 open end
7 close end
8 pipe body
9 container
10 heater
11 raw material hydrogen inlet
12 impurity-containing gas outlet
13 pure hydrogen outlet
14 opening of container
15 tip of container joint
16 tip of opening of container
17 packing
18 wall
19 raw material hydrogen supply pipe
20 impurity-containing gas collection pipe
21 pure hydrogen collection pipe 100, 100a palladium alloy membrane unit
200, 200a storage structure
300, 300a hydrogen purification device

The invention claimed is:

1. A palladium alloy membrane unit stored in a container and integrated with a storage structure to make up a hydrogen purification device, the storage structure being provided with the container, a raw material hydrogen inlet, and a pure hydrogen outlet, comprising:
a plurality of palladium alloy capillaries; a tube sheet; and a pure hydrogen discharge pipe, wherein
the plurality of palladium alloy capillaries each have a closed end and an open end,
the closed end is formed by closing one end of each of the plurality of palladium alloy capillaries,
the open end is formed at the other end of each of the plurality of palladium alloy capillaries,
the tube sheet has a disk-shaped periphery and a plurality of supports,
the plurality of supports each support each of the plurality of palladium alloy capillaries at their respective open ends, and
the discharge pipe has an discharge pipe body, a cylinder formed at one end of the discharge pipe body, the cylinder being in close contact with the periphery, an outlet joint formed at the other end of the discharge pipe body and connected with the pure hydrogen outlet, and a container joint is in close contact with an opening of the container at a position between the cylinder and the outlet joint.

2. The palladium alloy membrane unit according to claim 1, wherein the tube sheet, the discharge pipe, the outlet joint, and the container joint are coaxially set.

3. The palladium alloy membrane unit according to claim 1, wherein
the outlet joint has a detaching part having a capability of attaching to and detaching from a connecting member provided in the storage structure for connecting with the outlet joint, and
the container joint has a detaching part having a capability of attaching to and detaching from a contact member provided in the storage structure for being in close contact with the container joint.

4. A storage structure storing the palladium alloy membrane unit according to claim 1 and making up a hydrogen purification device together with the palladium alloy membrane unit, comprising:
a container having an opening formed at the end and a contact member in the opening, the contact member having a capability of being in close contact with the container joint, the container storing the plurality of palladium alloy capillaries inserted from the opening;
a heater heating the inside of the container from the outside;
a raw material hydrogen inlet supplying raw material hydrogen containing impurities to the container;
an impurity-containing gas outlet removing gas containing impurities not permeating the palladium alloy capillaries from the container; and
a pure hydrogen outlet having a connecting member having a capability of connecting with the outlet joint.

5. A method of purifying hydrogen using the palladium alloy membrane unit stored in the storage structure according to claim 4, comprising:
after the plurality of palladium alloy capillaries are used for a predetermined period, after the mechanical strength of the plurality of palladium alloy capillaries decreases, or after gas leaks from around the plurality of palladium alloy capillaries, replacing the palladium alloy membrane unit including the plurality of palladium alloy capillaries with a new one; and purifying hydrogen.

\* \* \* \* \*